United States Patent
Oride et al.

[11] 3,997,238
[45] Dec. 14, 1976

[54] HOLOGRAPHIC RECORDING PROCESS USING A THERMOPLASTIC PHOTOSENSITIVE MEMBER

[75] Inventors: Akiyoshi Oride, Tokyo; Michiharu Abe, Kawasaki, both of Japan

[73] Assignee: Ricoh Co., Ltd., Japan

[22] Filed: Sept. 30, 1975

[21] Appl. No.: 618,132

[30] Foreign Application Priority Data
Sept. 30, 1974 Japan ............................ 49-113217

[52] U.S. Cl. .................................. 350/3.5; 96/1.1; 178/6.6 TP; 340/173 TP; 346/77 E
[51] Int. Cl.² .................... G03H 1/18; G03G 16/00
[58] Field of Search ............... 350/3.5; 340/173 TP; 178/6.6 TP; 96/1.1; 346/77 E, 74 TP

[56] References Cited
UNITED STATES PATENTS

| | | | |
|---|---|---|---|
| 3,413,146 | 11/1968 | Anderson et al. | 96/1.1 |
| 3,821,722 | 6/1974 | Ost | 340/173 TP |
| 3,851,948 | 12/1974 | Gange et al. | 350/3.5 |

OTHER PUBLICATIONS

Lee, *Applied Optics*, vol. 13, No. 4, April 1974, pp. 888–895.

Primary Examiner—Ronald J. Stern
Attorney, Agent, or Firm—McGlew and Tuttle

[57] ABSTRACT

A holographic recording process uses a thermoplastic photosensitive member in which charging on the member and exposing the same to light having holographic information are carried out simultaneously, and an unevenness image corresponding to the information is ultimately formed on the member through a heating and a cooling step. The charging rate, charging-exposing time interval, light intensity and other factors are chosen to assure a high quality recording and hence a favorable image reproduction. In particular, the charging rate is chosen from those which lie in a region of characteristic curves above the line corresponding to 7 dB S/N ratio, the characteristic curves representing the relationship between the S/N ratio of the reproduced holographic image and the charging rate with parameters of the light intensity and the charging-exposing time interval. Further, if 15 dB S/N ratio is used as the limiting line, more than 30 times repeated use of the thermoplastic member is possible.

4 Claims, 9 Drawing Figures

HOLOGRAPHIC RECORDING PROCESS USING A THERMOPLASTIC PHOTOSENSITIVE MEMBER

BACKGROUND OF THE INVENTION

Figure 1:
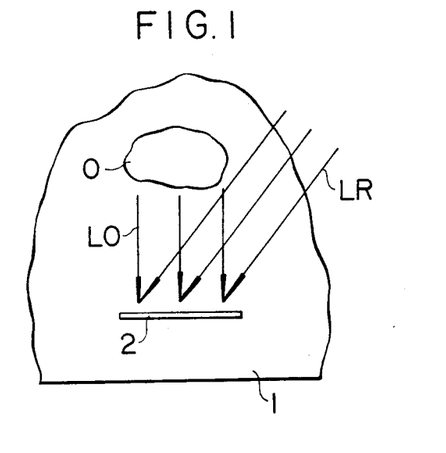
FIG. 1 is a schematic view illustrating the principle of a holograph recording.

The invention relates to a holographic recording process using a thermoplastic photosensitive member. As is well recognized, holography represents a recording process in which both the intensity and phase of light are recorded to permit a three dimensional reproduction of an image of an object being recorded. Specifically, a light having a time and spatial coherence, for example, a laser light, is split into a pair of beams along different paths, one of which is employed as an object illuminating light and the other as a reference light so as to cause an interference of the latter with the object light, that is, the object illuminating light which is reflected by the object. The resulting interference fringe is recorded on a sensitive member, for example, a thermoplastic photosensitive member 2 which is located at a given position on an optical bench 1, as shown in FIG. 1. In this Figure, the reference character O represents an object being recorded, and LO and LR an object illuminating light and a reference light, respectively. The interference fringe recorded on the thermoplastic photosensitive member 2 is developed to provide a hologram, and the described process is referred to as a holographic recording.

As mentioned previously, both the intensity and phase of the object light LO are recorded on the hologram, and therefore if the thermoplastic photosensitive member 2 carrying the hologram is disposed at the same position as it has been placed during the recording, and then illuminated with a laser light of the same wavelength as the reference light LR, which is utilized as a reproducing light, in the same direction as the reference light LR has been directed, the reproducing light will be diffracted by the hologram to reproduce the wave front which existed on the surface of the member 2 during the recording process, thereby reproducing a three dimensional, virtual image at the position of the object O shown in FIG. 1.

Figure 2:
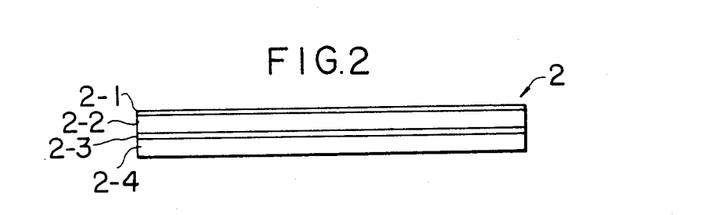
FIG. 2 is a schematic view of a typical thermoplastic photosensitive member.

The thermoplastic photosensitive member 2 comprises an image receptor material having both photoconductivity and thermoplasticity, one example of which is illustrated in FIG. 2. Specifically, the illustrated thermoplastic photosensitive member 2 comprises a lamination of a thermoplastic resin layer 2-1, which will be referred to as thermoplastic layer, a photoconductive layer 2-2 and a conductive layer 2-3 disposed in the sequence named on a base layer 2-4. The thermoplastic layer 2-1 is electrically insulating and has an electrical resistance comparable to that of the photoconductive layer 2-2 when placed in a dark place. The thermoplastic photosensitive member 2 which is used in forming a hologram is entirely constituted by a transparent material so that the reproduced virtual image can be observed through the hologram.

Figure 3:
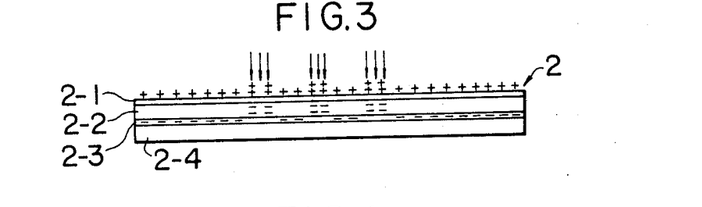
FIGS. 3 and 4 are schematic views illustrating the recording of an image in/or on the thermoplastic photosensitive member shown in FIG. 2 by a simultaneous process.

There are two broad categories of techniques for recording an image on a thermoplastic photosensitive member, namely, a sequential process and a simultaneous process. The invention is directed to the latter process, which will be specifically described below. As illustrated in FIG. 3, the surface of the thermoplastic layer 2-1 of the thermoplastic photosensitive member 2 is charged to the positive polarity, for example, and is exposed to a light image. In an illuminated area of the surface, the photoconductive layer 2-2 lying therebelow will become conductive to induce a negative charge in the interface between the thermoplastic layer 2-1 and the photoconductive layer 2-2 in such area, while in a dark area, the negative charge will be induced only in the interface between the conductive layer 2-3 and the photoconductive layer 2-2. As a result, the capacitance will be increased in a bright area as compared with a dark area. By charging the above surface to the positive polarity, the charge density in the bright area will be substantially increased relative to that in the dark area, thus forming an imagewise electrostatic latent image by a variation in the surface charge density.

Figure 4:
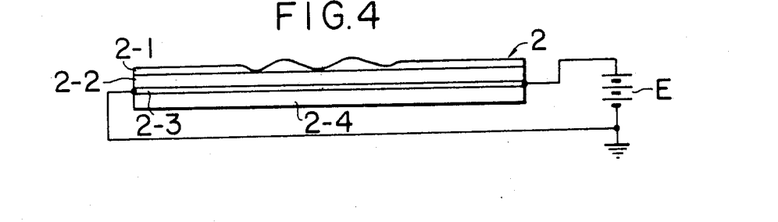

Subsequently, a current is passed through the conductive layer 2-3 by connecting it with a d.c. source E, as shown in FIG. 4, while the electrostatic latent image remains in the thermoplastic photosensitive member 2, so as to produce Joule heat which will heat the photosensitive member 2 to a temperature close to the softening point of the thermoplastic layer 2-1. Since the electrostatic force acting in the direction of the thickness of this layer is proportional to the square of the surface charge density, the softened thermoplastic layer 2-1 will be deformed in accordance with the latent image. For example, an area having a high charge density and thus corresponding to a bright area of the light image will be recessed. In this manner, an image of unevenness corresponding to the latent image is formed in the surface of the thermoplastic photosensitive member 2. Immediately upon formation of such a deformation image, the thermoplastic photosensitive member 2 is cooled to a temperature below the softening point, whereby the thermoplastic layer 2-1 is solidified while maintaining the deformation image, which is therefore fixed in the surface thereof. This process is referred to as thermal developing.

To form a hologram on or in the thermoplastic photosensitive member 2 thus means a recording of an interference fringe of the object light and the reference light as an unevenness image in the surface of the thermoplastic layer 2-1. As a recording member, a thermoplastic photosensitive member has excellent features of high sensitivity and repeated useability, but it involves a number of problems for practical use because of the fact that noises are produced in the reproduced image or the quality of the reproduced image is degraded as it is repeatedly used.

SUMMARY OF THE INVENTION

Therefore, it is an object of the invention to provide a holographic recording process using a thermoplastic photosensitive member which represent an improvement over the conventional process of simultaneous type and capable of producing a high sensitivity and high quality image in a stable manner.

DETAILED DESCRIPTION OF AN EMBODIMENT

Figure 5:
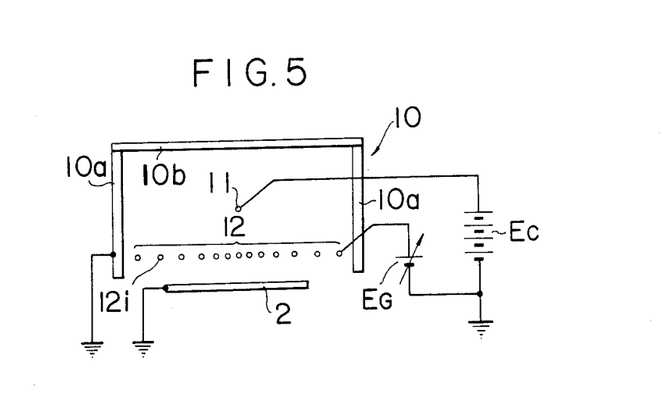
FIG. 5 is a schematic sectional view of a Scorotron charger which may be used in the reduction to practice of the process according to the invention.

Referring to FIG. 5, there is shown a Scorotron charger for the simultaneous holographic recording process which is constructed in accordance with one embodiment of the invention. The charger 10 comprises shield members 10a and 10b, a corona discharge electrode 11 and a grid 12, and is used to charge the surface of a thermoplastic photosensitive member 2 to the positive polarity. It is to be understood that the conductive layer 2-3 of the member 2 is connected with the ground through a grounding resistor at this time. The shield members 10a and 10b as well as the grid 12 are disposed in surrounding relationship with the discharge electrode 11. The shield members 10a and 10b are connected with the ground, and the shield member 10b comprises a transparent, electrically conductive glass on which indium oxide is evaporated. An object light and a reference light illuminate the member 2 through the shield member 10b.

The grid 12 is disposed between the member 2 and the discharge electrode 11 which comprises a thin tungsten wire extending in a direction perpendicular to the plane of the drawing. A d.c. voltage of variable magnitude is applied from a d.c. source $E_G$. The grid 12 comprises a plurality of individual electrode wires 12i which extend parallel to each other in a direction perpendicular to the plane of the drawing, but their relative spacing is close in a region adjacent to the discharge electrode 11 and the wires are increasingly spaced from each other away from the discharge electrode 11. The application of a grid voltage to the grid 12 thus formed achieves a uniform charging of the surface of the stationary thermoplastic photosensitive member 2.

Figure 6:
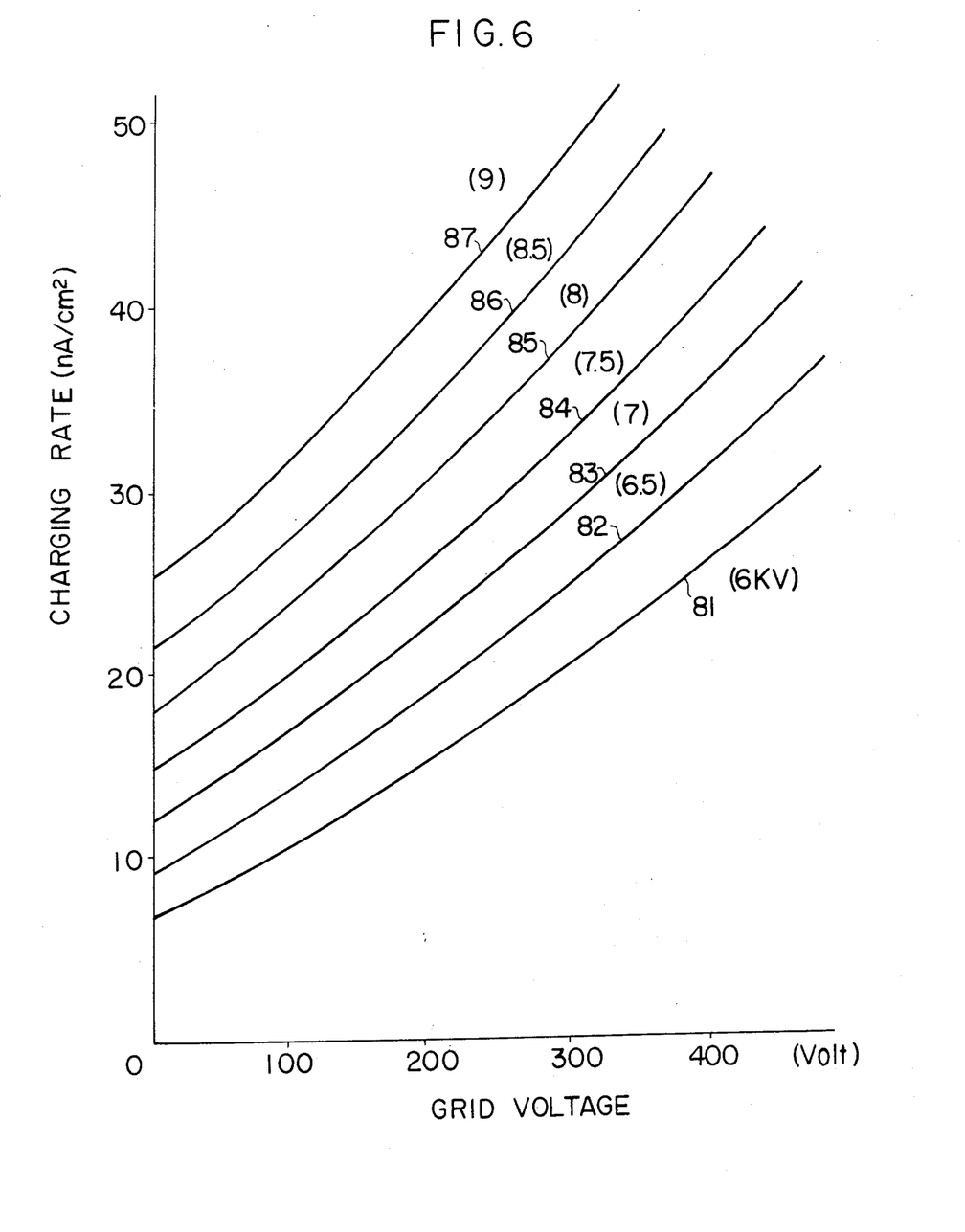
FIG. 6 graphically shows the relationship between the grid voltage applied to the charger and the charging rate.

When the grid voltage supplied to the Scorotron charger 10 is varied, the charging rate can be easily controlled. FIG. 6 shows the relationship between the corona current density taken on the ordinate and the grid voltage on the abscissa, curves 81 to 87 corresponding to respective parametrically varying voltages applied to the discharge electrode 11 of 6 kV, 6.5 kV, 7 kV, 7.5 kV, 8 kV, 8.5 kV and 9 kV.

Figure 7:
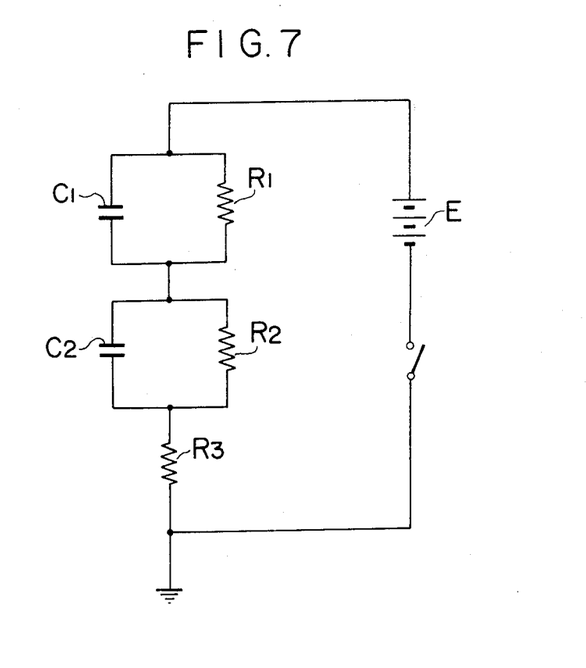
FIG. 7 is an equivalent circuit diagram of the system comprising the charger shown in FIG. 5, the thermoplastic photosensitive member and a power source.

An equivalent circuit of the system shown in FIG. 5, which comprises the charger 10, the member 2, and the d.c. sources $E_C$, $E_G$, is shown in FIG. 7 for the purpose of theoretical analysis. In FIG. 7, resistor R1 and capacitor C1 represent an equivalent circuit of the thermoplastic layer 2-1 of the member 2, and resistor R2 and capacitor C2 represent an electrical equivalent of the photoconductive layer 2-2 which is placed in a dark place. Resistor R3 represents a grounding resistor. A power source E is a functional equivalent of the charger 10 and the d.c. sources $E_C$, $E_G$. It is to be noted that these reference characters also represent their numerical values. Specifically, reference character R1 represents also the resistance of resistor R1 and the capacitance of the capacitor C1 is also represented by C1.

In general, resistors R1, R2 have a resistance on the order of $10^8 \Omega$ or higher, the resistor R3 has a value on the order of $10^4 \Omega$ or less, and the capacitors C1, C2 have a capacitance on the order of $10^{-9}$F, so that the products R1C1, R2C2 assume a value on the order of 0.1 to 10. Since the resistance R3 can be neglected as compared with the magnitude of the resistances R1, R2, the total current $i(t)$ which flows through the equivalent circuit can be expressed as follows:

$$i(t) = \frac{E}{R_1 + R_2} \left\{ 1 - (C_1 R_1 + 1)(C_2 R_2 + 1) e^{\alpha t} + \frac{R_1 + R_2}{R_3} e^{\beta t} \right\} \quad (1)$$

and $$\alpha = - \frac{R_1 + R_2}{(C_1 + C_2) R_1 R_2}, \quad \beta = - \frac{C_1 + C_2}{C_1 C_2 R_3} \quad (2)$$

wherein $t$ represents time.

Using the above equations, a variation of the charge on the capacitor C1 with time when it is in a dark place can be expressed as follows:

$$Q(t) = \frac{A}{R_1 + R_2} \left\{ 1 - (B + DR_2) e^{\alpha t} \right\} \quad (3)$$

In these formulas, the parameters A, B, D and R1 can be regarded as constants if the composition, structure and configuration of the thermoplastic photosensitive member 2 is standardized. Since the resistor R2 is an equivalent of the photoconductive layer 2-2, it may be considered as varying with the intensity I of the illuminating light in the following manner:

$$R_2(I) = - mI + R_2 \quad (4)$$

wherein $m$ represents a proportional constant.

The requirement to produce a hologram in the thermoplastic photosensitive member 2 in a manner such that the reproduced image has a uniform quality can be stated as maintaining the quantity $F(I, t_0)$, which is defined by the following equation, constant.

$$F(I, t_0) = \frac{Q_L(t_0) - Q_D(t_0)}{Q_D(t_0)} \quad (5)$$

In this equation, the character $t_0$ represents a recording time which is equal to an exposure period or a charging period. The character $Q_L(t_0)$ represents the magnitude of a positive charge in a bright area on the surface of the thermoplastic layer of the member 2 at the time $t_0$, and the character $Q_D(t_0)$ represents a corresponding magnitude of positive charge in a dark area. Since $F(I, t_0)$ is a function of both the light intensity $I$ and the recording time $t_0$, it will be seen that, if $t_0$ is changed, $I$ must be varied in a corresponding manner in order to maintain $F(I, t_0)$ constant.

To reduce the recording time $t_0$, the charging rate must be increased, which can be accomplished by increasing the corona discharge voltage or the grid voltage applied to the charger 10.

$F(I, t_0)$, after a time interval equal to time $t_0$, can be expressed in terms of the exposure intensity $I$ as follows:

$$F(I, t_0) = -1 + \frac{R_1 + R_2}{1 - (B + DR_2)e^{\alpha t_0}} f(I, t_0) \quad (6)$$

where $$f(I, t_0) = \frac{1}{R_1 + R_2 - mI}\left\{1 - (B + DR_2 - mDI)e^{\alpha(I)t_0}\right\} \quad (7)$$

and $$\alpha(I) = \frac{-R_1 - R_2 + mI}{(C_1 + C_2)R_1(R_2 - mI)} \quad (8)$$

By equating the equation (6) to a constant and solving the equation for $I$ or $t_0$, there is obtained a relationship between $I$ and $t_0$ which is necessary to maintain $F(I, t_0)$ constant.

The numerator on the right-hand side of the equation (5) is considered to be proportional to the contrast of a hologram and hence the contrast of a reproduced image. As a consequence, $F(I, t_0)$ must be increased to improve the contrast in the reproduced image. On the other hand, $Q_D(t_0)$ which represents the magnitude of the positive charge in a dark area of the thermoplastic photosensitive member 2, when allowed to exceed a certain threshold value, will cause a random frosting deformation in the surface of the thermoplastic layer 2-1 during the thermal developing, resulting in noises in the reproduced image. Therefore, in order to form a stable hologram of a high image quality in the thermoplastic photosensitive member 2, $F(I, t_0)$ should be maintained at as high a value as possible while maintaining $Q_D(t_0)$ below a given value.

Figure 8:
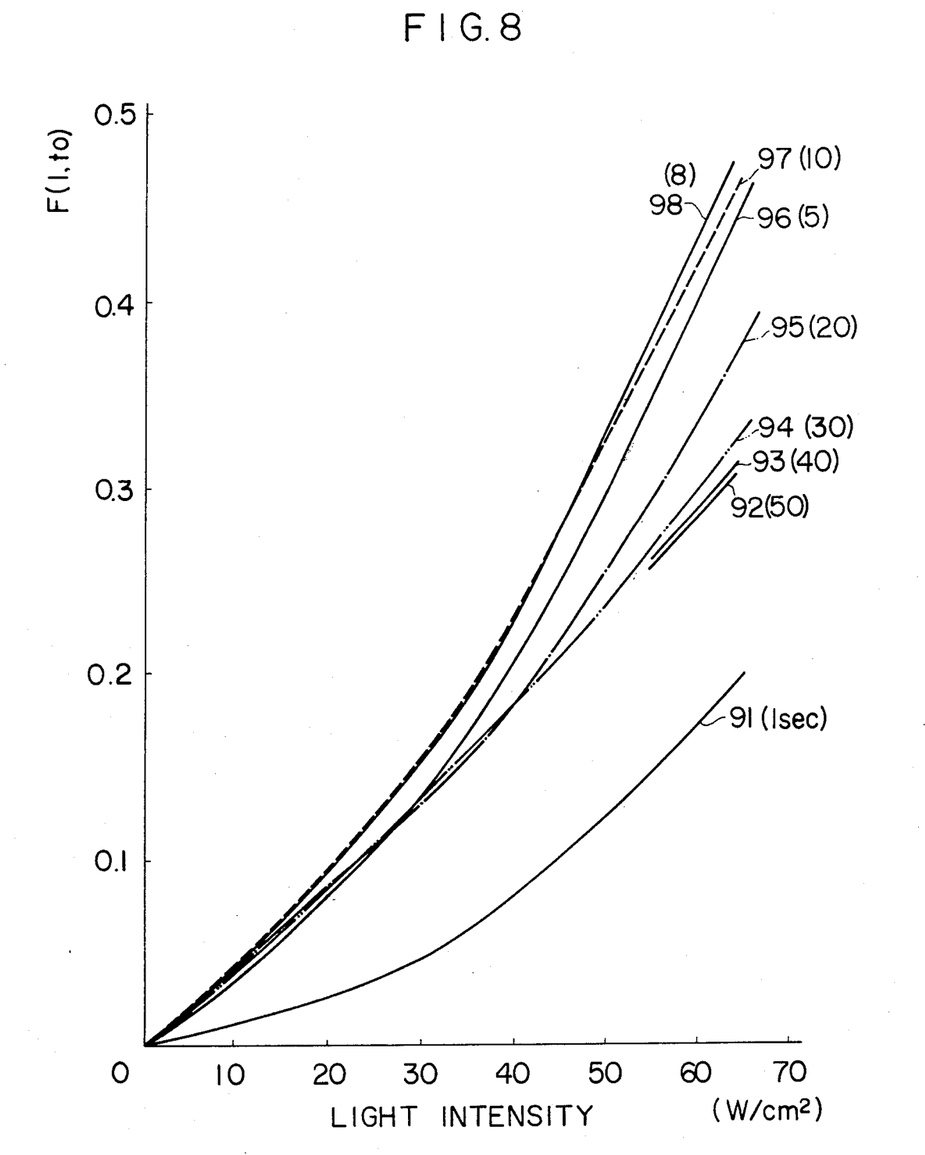
FIG. 8 graphically shows the dependence on the exposure intensity and the recording time of $F(I, t_0)$ which represents an important parameter in the holographic recording in order to achieve a good image reproduction.

FIG. 8 graphically shows the dependence of $F(I, t_0)$ (taken on the ordinate) on the light intensity $I$ (shown on the abscissa) when varying the recording time $t_0$ as a parameter, and using an exemplary photosensitive member which exhibits characteristic values of $R1 = 2.9 \times 10^9 \Omega$, $R2 = 1.7 \times 10^9 \Omega$, $c1 = 5.6 \times 10^{-9}F$, $C2 = 2.8 \times 10^{-9}F$ and $m = 1.7 \times 10^7$. Curves 91 to 98 correspond to respective parameters $t_0$ of 1, 50, 40, 30, 20, 5, 10 and 8 seconds, respectively. The value of $\alpha$ was approximately $-0.1$. It will be seen from FIG. 8 that the light intensity should be generally increased in order to obtain a high quality image or to increase $F(I, t_0)$. In a high speed recording requiring a recording time $t_0$ on the order of one second, it is seen that a relatively low exposure can be advantageously used for $F(I, t_0) = 0.1$ but that $F(I, t_0)$ cannot be substantially increased by increasing the exposure intensity, indicating that a high quality image cannot be expected. Finally, it will be seen that $t_0$ should preferably be chosen to have a value on the order of $$\left|\frac{1}{\alpha}\right|$$

in order to increase $F(I, t_0)$ by increasing the light intensity $I$.

On the basis of the above theoretical considerations, a number of experiments have been conducted using the Scorotron charger 10 while varying the recording time $t_0$, the light intensity $I$ and the charging rate. The thermoplastic photosensitive member 2 used comprised a base layer 2-4 formed by a glass plate on which indium oxide was evaporated to form a transparent conductive layer 2-3, which was overlaid with a charge migration complex comprising a mixture of poly-N-vinylcarbazol and 2, 4, 7-trinitrofluorenone in a molar ratio of 16:1 which was applied to a thickness of 2 μm, and on the resulting transparent photoconductive layer 2-2 was applied Stabelite ester 10 (trademark) to a thickness of 1 μm. The member is sized 60 × 60 mm, and the object being recorded had a size of 60 × 60 mm and an average reflectivity of 10%. The thermal developing comprised the above-mentioned technique which utilizes Joule heat.

EXAMPLE I

By choosing a charging rate of 20 nA/cm² and a recording time of 30 seconds, a Fresnel hologram was recorded in the thermoplastic photosensitive member 2 while varying the intensity of the object light in a range from 1:1 to 1:3 of the ratio for the intensity of reference light relative to that of the object light. Below 0.5 × $10^{-7}$W/cm² of the intensity of the object light, the experiment failed to produce a hologram of satisfactory quality. A satisfactory hologram was not obtained within a recording time of 60 seconds even if the charging rate was varied.

Then the intensity of the laser light was increased, and a hologram producing a reproduced image of good quality was obtained above the intensity of the object light of 1.3 × $10^{-3}$W/cm². Above this intensity of the object light, a satisfactory hologram was obtained when the intensity of the reference light was changed to twice and three times that of the object light.

EXAMPLE II

Employing a charging rate of 20 nA/cm², a recording time of 30 seconds and the intensity of the object light of 1.3 × $10^{-3}$W/cm², and varying the ratio of the intensity of the object light to that of the reference light over a range from 1:1 to 1:3, a holographic recording and an erasure has been repeated on the same thermoplastic photosensitive member 2. As the number of repeated uses increased, a degradation was noted in the quality of the reproduced image. However, it was found that a degradation in the reproduced image quality with an increase in the number of uses could be prevented by gradually increasing either the grid voltage of the charger 10 or the recording time.

EXAMPLE III

Employing a charging rate of 32 nA/cm² and a recording time of 30 seconds, a hologram was formed in the thermoplastic photosensitive member 2. Below 1.3 × $10^{-3}$W/cm² of the intensity of the object light, a hologram was obtained which produced a reproduced image of good quality. No degradation in the image quality reproduced was noted up to 30 times of repeated use under the same condition. Subsequently, maintaining the charging rate and the recording time as given above, the intensity of the laser light was reduced to an intensity of the object light of $0.5 \times 10^{-7}$W/cm$^2$. No satisfactory image reproduction was obtained over a range of the intensity ratio of the object light to reference light from 1:2 to 1:3.

EXAMPLE IV

Employing a charging rate of 32 nA/cm$^2$, a recording time of 30 seconds and an intensity of the reference light ranging from $0.5 \times 10^{-7}$W/cm$^2$ to $5.2 \times 10^{-7}$W/cm$^2$ and applying a black mask over the object being recorded to change the area to be illuminated, the permissible range of the intensity ratio between the object light and the reference light has been examined while varying the intensity of the object light. It was found that, at the intensity of the object light of $1.3 \times 10^{-7}$W/cm$^2$, a favorable reproduction image was obtained in the range of the light intensity ratio from 1:2 to 1:4. When the area of the object to be illuminated and the intensity of the object light were varied, a favorable reproduced image was obtained for a range of the intensity of the reference light from $2.0 \times 10^{-7}$W/cm$^2$ to $5.2 \times 10^{-7}$W/cm$^2$, and it was found that the intensity ratio from 1:2 to 1:100 was permissible. However, below $1.5 \times 10^{-7}$W/cm$^2$ of the intensity of the reference light, no favorable image reproduction was obtained over a range of the intensity ratio from 1:2 to 1:100.

EXAMPLE V

Figure 9:
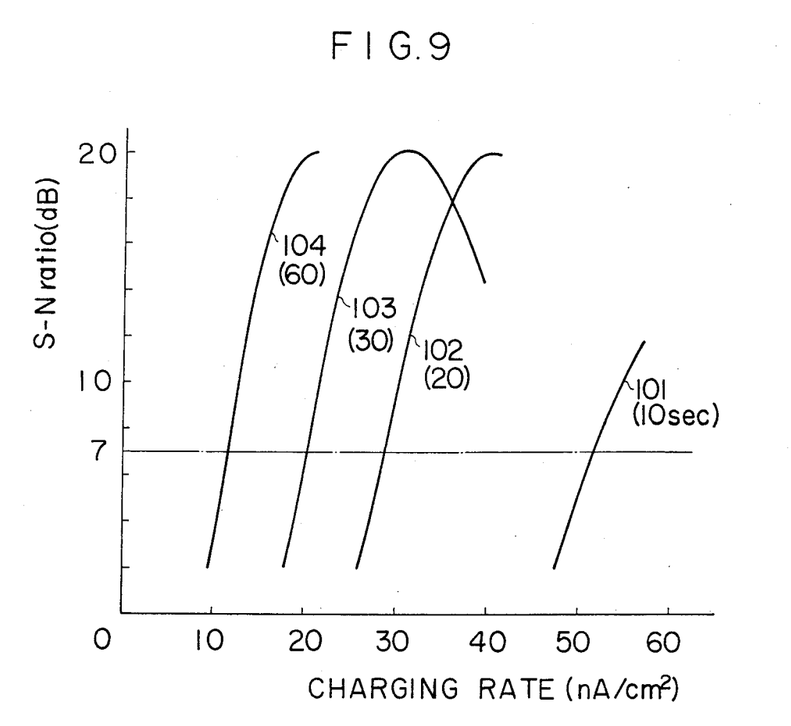
FIG. 9 graphically shows the relationship between the S/N ratio of the reproduced image and the charging rate, with the recording time being varied as a parameter.

At the light intensity of $1.3 \times 10^{-7}$W/cm$^2$, the dependence of the S/N ratio of the reproduced image on the charging rate was determined by varying the charging rate in a range from 10 to 60 nA/cm$^2$, with the recording time being varied as a parameter. The results are shown in FIG. 9 wherein the ordinate represents the S/N ratio of the reproduced image in decibels while the abscissa represents the charging rate. Curves 101, 102, 103 and 104 correspond to recording times of 10, 20, 30 and 60 seconds, respectively. It will be seen from FIG. 9 that the charging rate must be chosen in a range which varies with the recording time in order to assure a certain level of the reproduced image quality. For example, if the S/N ratio of the reproduced image is chosen to be not less than 7 db for practical purposes, a charging rate must be chosen which lies in a region of the curves 101 to 104 above the line corresponding to 7 db S/N ratio. By way of example, if a recording time of 30 seconds is used, the charging rate used must be greater than 21 nA/cm$^2$ and less than 48 nA/cm$^2$.

From the foregoing examples, it will be appreciated that an increase in the exposure intensity produces a favorable hologram, and an increase in the charging rate permits a reduction in the recording time, as supported by the aforementioned theoretical considerations.

It will be understood that the characteristic curves 101 to 104 shown in FIG. 9 depend on the composition, structure and configuration of the thermoplastic photosensitive member 2 which was used in the above-mentioned experiments. However, if their composition, structure or configuration is changed, characteristic curves which are qualitatively similar to those shown in FIG. 9 are obtained. Thus a holographic recording which assures a favorable image reproduction is assured by choosing a charging rate in a region above 7 db of the S/N ratio in accordance with the recording time used. It is also to be noted that the exposure intensity is also one parameter in the graphic illustration of FIG. 9. Thus, the exposure intensity used in obtaining the results shown in FIG. 9 was $1.3 \times 10^{-7}$W/cm$^2$, but a reduction in the exposure intensity results in a shift to the right of the characteristic curves in FIG. 9 while an increase in the exposure intensity results in a shift of the characteristic curves to the left. Thus, while a good hologram cannot be formed in Example I at an intensity of the object light of $0.5 \times 10^{-7}$W/cm$^2$, it is possible to produce a good holographic recording by suitably increasing the charging rate and the recording time.

Though an increase in the charging rate while maintaining a constant recording time is effective to improve the S/N ratio of the reproduced image, it will be also noted from FIG. 9 that an excessively high charging rate results in a reduction in the S/N ratio of the reproduced image, as illustrated by the characteristic curve 103. It is believed that this is caused by a surface potential in a dark area which exceeds the previously mentioned threshold value as a result of a rapid charging, thereby producing a random frosting deformation during the thermal developing step.

In FIG. 9, it is also found that, when a charging rate for a given recording time is chosen in a region of the characteristic curves located above 15 db of the S/N ratio, for example, when choosing the charging rate of a value from 22 to 37 nA/cm$^2$ for a recording time of 30 seconds, a degradation in the quality of reproduced image, which will otherwise occur with an increase in the number of repeated uses has been substantially avoided.

In the conventional simultaneous process, it is also known to perform a precharging for a give time period prior to the initiation of the exposure and to terminate both the charging and exposure simultaneously when the recording time is expired. However, it is found that the precharging should be avoided for the purpose of achieving a high sensitivity and a high image quality.

What is claimed is:
1. A holographic recording process comprising the steps of:
   1. providing a thermoplastic photosensitive member comprising a lamination of a thermoplastic layer, a photoconductive layer and a conductive layer disposed in the sequence named on a base member,
   2. grounding said conductive layer,
   3. charging on the surface of said thermoplastic layer with a charging rate and exposing the same to light having an intensity and holographic information, simultaneously during a time interval to thereby provide a current to flow through said lamination which current is defined by the following equation:

$$i(t) = \frac{E}{R_1 + R_2}\left\{1 - (C_1R_1 + 1)(C_2R_2 + 1)e^{\alpha t} + \frac{R_1 + R_2}{R_3}e^{\beta t}\right\} \quad (1)$$

and $$\alpha = \frac{R_1 + R_2}{(C_1 + C_2)R_1R_2} \qquad \beta = \frac{C_1 + C_2}{C_1C_2R_3} \qquad (2)$$

wherein
- $R_1$ and $C_1$: the resistance and capacitance of the thermoplastic layer, respectively,
- $R_2$ and $C_2$: The resistance and capacitance of the photoconductive layer, respectively,
- $R_3$: a groundng resistance,
- $E$: a voltage across the lamination, caused by the charging, and
- $t$: the time elapsing after the initiation of the charging-exposing step;
  i. said charging rate being chosen from those which lie in a region of characteristic curves above the line corresponding to 7 dB S/N ratio, and
  ii. said characteristic curves representing the relationship between the S/N ratio of the reproduced holographic image and the charging rate with parameters of the light intensity and the charging-exposing time interval, 4. subsequently heating the thermoplastic layer to a temperature close to its softening point, and
5. cooling the softened thermoplastic layer to be solidified immediately after said heating step.

2. The process as in claim 1 wherein said charging-exposing time interval is substantially $$\left| \frac{1}{\alpha} \right|$$

seconds.

3. The process as in claim 1 wherein said heating step comprises passing a current through said conductive layer to cause Joule heat.

4. The process as in claim 1 wherein said charging-exposing step comprises using a charging rate which lies in a region of said characteristic curves above the line corresponding to 15 dB S/N ratio for the purpose of the repeated use of the thermoplastic photosensitive member.

* * * * *